United States Patent [19]
Reynolds

[11] 3,821,368
[45]* June 28, 1974

[54] THERAPEUTIC COMPOSITION

[75] Inventor: Beverly L. Reynolds, Dallas, Tex.

[73] Assignee: Cybersal, Inc., Dallas, Tex.

[*] Notice: The portion of the term of this patent subsequent to July 11, 1989, has been disclaimed.

[22] Filed: July 21, 1972

[21] Appl. No.: 273,701

Related U.S. Application Data

[63] Continuation-in-part of Ser. No. 149,081, June 1, 1971, abandoned, which is a continuation-in-part of Ser. No. 885,295, Dec. 15, 1969, Pat. No. 3,676,553.

[52] U.S. Cl.................. 424/128, 424/153, 424/154, 424/156
[51] Int. Cl............................................. A61h 27/00
[58] Field of Search ............ 424/128, 153, 154, 162

[56] References Cited
UNITED STATES PATENTS

| | | | |
|---|---|---|---|
| 233,063 | 10/1880 | Boughton | 424/128 |
| 2,224,252 | 12/1940 | Callaway | 99/1 |
| 2,265,453 | 12/1941 | Schmidt | 424/128 |
| 3,337,404 | 8/1967 | Polli et al. | 424/153 |
| 3,356,570 | 12/1967 | Butcher | 424/153 |
| 3,676,553 | 7/1972 | Reynolds | 424/128 |

*Primary Examiner*—Stanley J. Friedman
*Attorney, Agent, or Firm*—Clegg & Cantrell and Crisman

[57] ABSTRACT

A therapeutic composition comprised of an aqueous medium containing about 75–150 millimoles of $Na^+$, about 5–50 millimoles of $K^+$, about 5–50 millimoles of $HCO_3^-$, about 75–150 millimoles of $Cl^-$ and preferably containing about 1–30 millimoles of $Mg^{++}$ and about 1–30 millimoles of $HPO_4^{--}$ and/or $SO_4^{--}$; the solution having a pH of about 5.95–8.4 and an osmolality of about 170–460 and preferably about 260–340 and more preferably 290–310. The solution can be administered orally but preferably parenterally. Also, the anhydrous form of the composition in a tablet form as well as an oral composition containing flavoring agents is taught.

7 Claims, 1 Drawing Figure

3,821,368
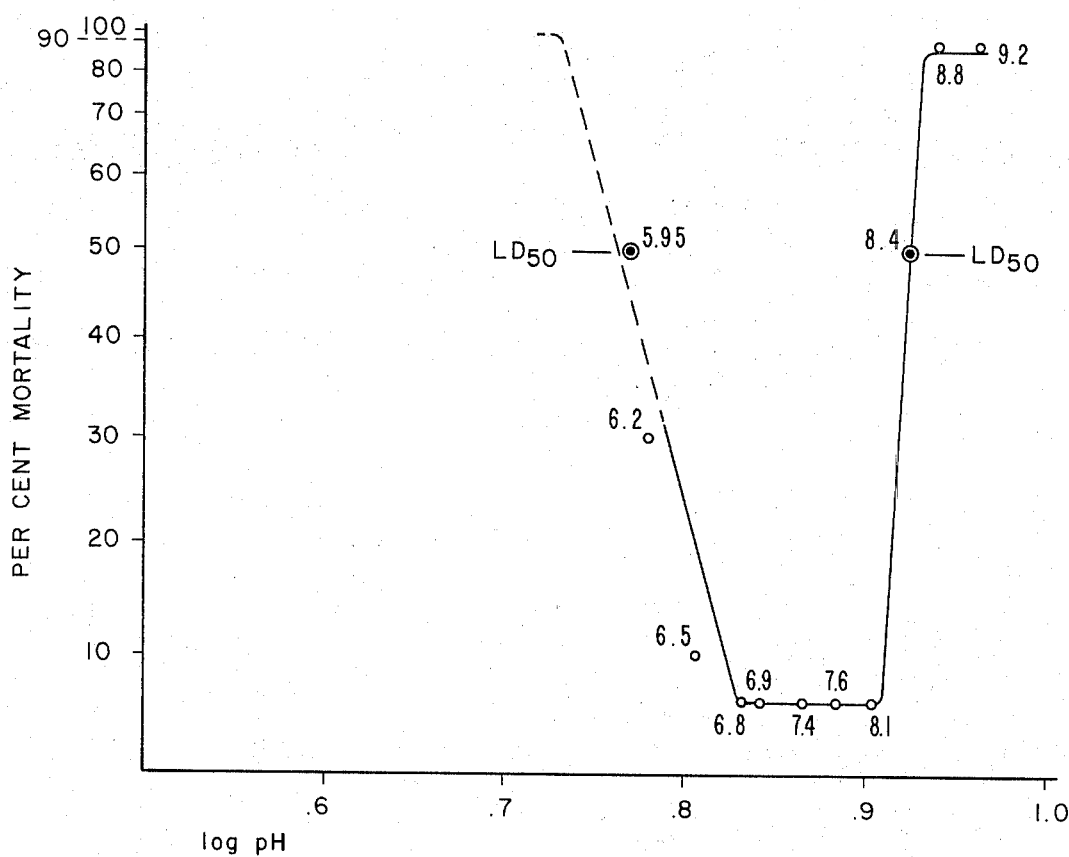
o  MEASURED POINTS; 5
   OR MORE CANINES PER SERIES
⊙  CALCULATED POINTS

THERAPEUTIC COMPOSITION

BACKGROUND OF THE INVENTION

This application is a continuation-in-part of my copending U.S. application Ser. No. 149,081 filed June 1, 1971 entitled "Method For Administering Water Soluble Drugs, Nutrients and Other Solutes to a Mammal" now abandoned which is in turn a continuation-in-part of my earlier filed U.S. application Ser. No. 885,295 filed Dec. 15, 1969, now U.S. Pat. No. 3,676,553.

After accidental or elective operative injury to human patients, there occurs a decrease in the hemoglobin concentration, an elevation of the erythrocyte sedimentation rate of peripheral blood, and a loss of red blood cells (RBC) from the effective blood volume. These events are recognized as anemia. Also, immediately subsequent to the injury the white cell count is usually elevated, and the thrombocyte count is decreased, implicating pancytic mechanisms.

The administration of whole blood is useful to rectify the pancytic changes. However, most surgeons have been unable to maintain adequate quantities of peripheral total hemoglobin, red blood cells, and thrombocytes through the use of whole blood, even when quantities far in excess of that lost by bleeding are infused. Also, the collection and storage of whole blood generally produces a hyperosmolar, acidic water solution, as a result of the changes in RBC and blood water during collection and storage. Furthermore, whole blood is expensive, and may produce unwanted immunohematological responses in the recipient.

The surgeon and anesthesiologist generally have four other choices, i.e., instead of whole blood infusion, to niques of increasing complexity, is exposed to body water infusates which are at variance, frequently extreme, with the physicochemical content in health.

Altering ionic content of water solutions has not provided the water environment considered optimal during elective or traumatic operative therapy. Furthermore, synthetic water solutions should provide support to the patient in excess of maintenance of blood water volume. Water for injection, sterile, U.S.P., may be used to replace or expand blood water lost during elective or accidental trauma, if the sole purpose of administered water solution is the replacement of water losses. However, the anemia of injury is more intense in the post-operative period after use of sterile water or of other similar hypo-osmolar solutions, resulting in prolonged morbidity, particularly in post-operative hospital time, and accounting for the more frequent use of whole blood before, during, and after operation.

The addition of solium chloride to sterile water, in so-called isotonic concentration (154 mEq/L [milliequivalents/liter]), has reduced only minimally the post-operative anemia. Such a solution has enhanced water retention significantly, as evidenced by consistent gain in weight during operation when saline is administered. Complementing normal saline solutions with potassium and calcium in concentrations equivalent to plasma water (10 mEq/L, total) has had little additional effect. Hence, the addition of ions to sterile water in quality and at concentrations approximately those in blood water has not significantly reduced anemias observed from the use of sterile water alone.

Examples of parenterally administrable preparations in current use are:

| Solution | Approximate pH | Cations (mEq/L) | | | | Anions (mEq/L) | | | | | |
|---|---|---|---|---|---|---|---|---|---|---|---|
| | | Na | K | Mg | Ca | Cl | Phosphate | HCO$_3$ | Acetate | Gluconate | Lactate |
| Human Plasma | 7.4 | 140 | 4-5 | 2-3 | 5 | 102 | 2.5 | 27 | — | — | 5 |
| Normosol R* pH 7.4 | 7.4 | 140 | 5 | 3 | — | 98 | — | — | 27 | 23 | — |
| Lactated Ringer's | 6.5 | 130 | 4 | — | 3 | 109 | — | — | — | — | 28 |
| Normal Saline | 5.4 | 154 | — | — | — | 154 | — | — | — | — | — |
| Dextrose 5% in saline | 4.6 | 154 | — | — | — | 154 | — | — | — | — | — |
| Polysal** | 6.2 | 140 | 10 | 3 | 10 | 103 | — | — | — | 55 | — |
| Plasma-Lyte*** | 6.2 | 140 | 10 | 3 | 5 | 103 | — | — | 47 | — | 8 |

\* Trademark of Abbott Laboratories, North Chicago, Illinois
\** Trademark of Cutter Laboratories, Berkeley 10, California
\***Trademark of Baxter Laboratories, Inc., Morton Grove, Illinois correct these adversities. These are administration of (1) plasma, (2) separated (Packed) erythrocytes, (3) synthetic water solutions, or (4) synthetic water solutions containing synthetic protein. Plasma has some of the disadvantages of whole blood. Separated erythrocytes, besides being expensive, have the disadvantage of decreases in functional and structural life after reinfusion. In recent years, synthetic water solutions, with or without protein, have been used to re-establish normalcy in peripheral vascular volumes and for maintenance of blood pressure.

The development of synthetic water solutions in the prior art has emphasized ionic content, particularly sodium chloride, with little regard to other physicochemical requirements. Such thinking is still current. The most recently introduced water solutions beg their use through ionic contents equivalent to plasma water as the latter appears during health. Also, the blood water of patients, receiving a multitude of new anesthetic agents and adjuvants and subjected to operative tech- Certain of these solutions are compared in specific tests with applicant's aqueous solution.

SUMMARY OF THE INVENTION

Applicant has discovered a therapeutic composition, preferably administered parenterally, to overcome at least most of the disadvantages of similar aqueous solutions in the prior art. The formulation is based on the mean solute values in extracellular water (referred to herein as ECW) and is designed to minimize water movements into fixed cells after operative, anesthetic and accidental trauma. Also, applicant's parenteral solution diminishes loss of functional decrements in all body systems, particularly heart and circulating fluids, lung, kidney, gastrointestinal tract and brain. Applicant's composition is useful in tablet form, oral dosage form containing flavoring agent, etc.

DESCRIPTION OF THE DRAWING

FIG. 1 is a graphical presentation of results obtained during hemorrhaging and solution replacement tests performed on canines with solutions formulated in accordance with the invention, and illustrates the influence on results of the pH parameter of the invention.

DESCRIPTION OF THE PREFERRED EMBODIMENTS

Applicant's therapeutic composition is preferably iso-osmolar with respect to the mean osmoality of ECW. The mobility osmolality of the ions is preferably maximal in the ECW to minimize ICW (intracellular water) depletion or overload. Also, the water content is preferably representative of the ratio of water to solute loss during the operative procedure or trauma of imbalance.

In extracellular water, the major cations are $H^+$, $K^+$, $Na^+$, $Ca^{++}$, and $Mg^{++}$ whereas the major anions are $OH^-$, $HCO_3^-$, $Cl^-$, $SO_4^=$, $HPO_4^=$, and IOA ("impermeable" organic anions). The relative size of the hydrated ions, as references to $K^+$, and the velocity of each ion in water, in a uniform electrical field, are:

| Solute cation | Solute anion | Velocity of solute ion under gradient of one volt/cm (univalent ion) or 0.5 volt/cm (divalent) | Relative diameter of solute ion, Angstroms |
|---|---|---|---|
| $H^+$ | | 315 | 0.20 |
| $K^+$ | | 64.2 | 1.00 |
| $Na^+$ | | 43.2 | 1.49 |
| | $OH^-$ | 173 | 0.37 |
| | $HCO_3^-$ | 133 | 0.72 |
| | $Cl^-$ | 65.2 | 0.98 |
| | IOA | 35 | 1.84 |
| | $SO_4^{--}$ | 34 | 1.89 |
| | $HPO_4^{--}$ | 28 | 2.29 |
| $Ca^{++}$ | | 25.5 | 2.51 |
| $Mg^{++}$ | | 22.5 | 2.84 |

The mobility coefficient of each ion in dilute water solution is dependent upon the size of the hydrated ion and upon its velocity under a uniform electrical gradient. Changes in solute content, pH, and osmolality affect the mobility coefficients. The $Mg^{++}$, $HPO_4^{--}$ and $SO_4^{--}$ ions are implicated as components of intercellular water or interstitial water substrates during glycolysis of oxidative reaction sequences in energy metabolism.

Applicant's parenteral solution contains sodium ($Na^+$) and potassium ($K^+$) as the principal major cation solutes, and bicarbonate ($HCO_3^-$) and chloride ($Cl^-$) as the primary anion solutes. These were selected because their coefficients of mobility, with hydrogen ($H^+$) and hydroxyl ($OH^-$), are maximal with respect to all other solutes, in any given situation. Magnesium ($Mg^{++}$) was selected as the principal minor solute cation, and phosphate ($HPO_4^=$) and/or sulfate ($SO_4^=$) and/or gluconate or other organic anions as the principal minor solute anion. The $Mg^{++}$, $HPO_4^=$ and $SO_4^=$ ions assist in stabilization of solute velocities, hence distribution, in the extracellular water and/or the intracellular water. The concentration of the ions in applicant's aqueous solution are given in millimoles as:

The administrable solution can have an osmolality (defined as the product of the activity coefficient of each species times the quantity in millimoles dissolved in 1 liter of water) within the range of from about 170 to about 460, preferably from 260 to 340, more preferably from 290 to 310 and most preferably about 300. The pH can desirably range from about 5.95 to about 8.4 and preferably is within the range of 6.8 to 8.2 and more preferably about 7.0 to about 8.0. The most preferred range is between about 7.0 and about 7.6. It is not necessary that the $Mg^{++}$, $SO_4^=$, and $HPO_4^=$ be present but it is preferred where stabilization of solute velocities, thus distribution, is desired in the ECW and/or ICW. Known water soluble salts containing the above ions are useful to make up the solution in U.S.P. water. Examples of such salts include NaCl, KCl, $NaHCO_3$, $KHCO_3$, $MgCl_2$, $Na_2SO_4$, $Na_2HPO_4$, $MgSO_4$ and $K_2HPO_4$.

A preferred composition for parenteral administration is one containing about 25 millimoles of $NaHCO_3$, about 17 millimoles of KCl, about 103 millimoles of NaCl and about 5 millimoles of $MgSO_4$.

Solutions having an osmolality less than about 290 can be designed to move into the cells; thus, such solutions are useful in treatment of heat stroke. However, if the osmolality desired is in excess of about 310, the solution can be designed to attract water out of the cells. As a result, such solutions are useful, for example, in the treatment of overdoses of barbituates or any situation resulting in an unusual accumulation of water within the cells.

The pH of the solution is desirably between about 5.95 and about 8.4. Within this broad range, it is preferred that the pH be within about 6.8 to about 8.2 and still more preferred to hold the pH between about 7.0 to about 8.0. The most preferred range is between about 7.0 to about 7.6. pH levels in the ranges set forth are preferably obtained by using the appropriate salts taught within this invention, and such solution will be highly buffered against pH changes. Adjustment of the pH can be obtained, if desired, with known acids or bases, e.g., HCl, $H_2CO_3$, NaOH, $CO_2$ gas, etc., whose reactions with the solution will not produce ion solutes different from those specified.

The solution is preferably administered parenterally; but, it can be administered orally. Where oral administration is desired, the salt components are desirably chosen to eliminate objectionable taste of the solution. For example, KCl can impart a bad taste. A more acceptable solution from the standpoint of taste is one containing $KHCO_3$, $NaHCO_3$, $MgCl_2$ and $Na_2SO_4$. Flavoring agents, e.g., orange flavoring, etc. and pharmaceutically acceptable vitamins in dosage form compatible with applicant's composition can be incorporated. For example, vitamin C is useful where the solution is taken orally. Other additives pharmaceutically acceptable and compatible with applicant's composition can also be incorporated.

| Ion | Minimum | Maximum | Preferred | Most Preferred |
|---|---|---|---|---|
| Sodium ($Na^+$) | 75 | 150 | 85–140 | 128 |
| Potassium ($K^+$) | 5 | 50 | 10–40 | 17 |
| Magnesium ($Mg^{++}$) | 1 | 30 | 2–20 | 5 |
| Phosphate ($HOP_4^{--}$) or Sulfate ($SO_4^{--}$) or Organic ions | 1 | 30 | 2–20 | 5 |
| Bicarbonate ($HCO_3^-$) | 5 | 50 | 10–40 | 25 |
| Chloride ($Cl^-$) | 75 | 150 | 85–130 | 120 |

Also, the appropriate amount of cations and anions can be contained in the anhydrous form as well as a concentrated hydrous form. The hydrous form can be at a concentration more than the desired osmolality and, before administration, it can be diluted to the desired osmolality. By containing the solution at a high ion concentration, shipping charges, storage costs, etc. can be reduced.

Regarding the anhydrous form, the appropriate salts and the desired amounts of salts can be contained in a protective container (a pharmaceutically acceptable container) so that the convenient dilution to the desired volume and at the desired place of usage can be obtained. Also, the salts can be compressed in a uniform mixture and can optionally contain an inert diluent, e.g., binder. Thus, the salts can be embodied in a tablet suitable for dilution and eventually oral administration.

The tablet binder is a pharmaceutically acceptable binder and is preferably one that produces minimum osmotic effects and is one that is not ionized. Examples of useful binders include nonionic detergents such as Pluronic F-68 (trademark of Wyandotte Chemicals Corp., defined as a condensate of ethylene oxide with a condensate of propylene oxide and propylene glycol) and similar nonionic detergents, preferably having molecular weights above about 8,000. Also, the tablet can contain pharmaceutically acceptable effervescent agents such as citric acid, tartic acid, etc. Where the salts are in the anhydrous form, the concentration of the ions can be (mole percent):

| Ion | Range | Preferred Range | Most Preferred Range |
| --- | --- | --- | --- |
| $Na^+$ | 46.3–32.6 | 44.0–35.9 | 42.7 |
| $K^+$ | 3.1–10.9 | 5.2–10.1 | 5.7 |
| $Mg^{++}$ | .6– 6.5 | 1.0–5.1 | 1.7 |
| $HPO_4^{--}$ or $SO_4^{--}$ | .6– 6.5 | 1.0– 5.1 | 1.7 |
| $HCO_3^-$ | 3.1–10.9 | 5.2–10.1 | 8.3 |
| $Cl^-$ | 46.3–32.6 | 44.0–33.4 | 40.0 |

Where the $Mg^{++}$ and $HPO_4^=$ and/or $SO_4^=$ ions are absent, the molar composition can be about 37.5–46.9% $Na^+$, about 31.1–12.5% $K^+$, about 3.1–12.5% $HCO_3^-$, and about 46.9–37.5% $Cl^-$. But, preferably, the $Mg^{++}$ and $HPO_4^=$ and/or $SO_4^=$ are present.

Applicant's solution is preferably administered to mammals before operation, during anesthesia, during operation and after operation or trauma. Desirably, it is administered in quantities calculated to replace water and osmolar losses in the ECW. Excessive administration of the solution can be tolerated by the mammal, however, over-expansion of the ECW can modify moble cell mobilization. Preferably, the solution is administered before trauma and in amounts calculated to replace water and osmolar losses in the ECW. Where administered before operation and before anesthesia, it is preferably begun about 2 hours prior to anesthesia.

Proper administering of applicant's solution, inter alia, can have the following benefits:

1. iso-osmolar expansion of ECW with predictable equilibration of administered water between circulating water volume and ISW (Interstitial Water) space components of ECW;
2. As a result of (1), a high tolerance of unplanned overloading of the circulating water volume—thus hypertension, cardiac pulmonary failure and coma can be reduced;
3. As a result of (1), maintenance of suspension indices of solutes, e.g., mobile cells, lipids, and proteins, in ECW is obtained;
4. as a result of (1) and (3), iso-osmolar expansion of large solutes in ECW is obtained;
5. as a result of (4), minimization of mobile cell destruction (particularly red cell) and of intravascular aggregation of cells is obtained—both of which otherwise follow planned or unplanned trauma;
6. as a result of (1), enhancement of perfusion of tissues during elective, operative, and anesthetic trauma, with or without prior accidental trauma, is reduced.

A material benefit which flows from the use of the applicant's solution is a reduction in the amount or volume of solution which must be administered, as compared to other prior art parenterally administerable solutions, in order to obtain the desired physiological results. In most instances and for most purposes, the volume of applicant's solution which is desirably administered is approximately the same as the volume of liquid lost during operation or trauma. This contrasts quite favorably with the consensus of opinion on good practice with lactated Ringer's solution, which consensus directs that approximately four times the liquid lost should be replaced with lactated Ringer's solution, and with the consensus with regard to normal saline solution, which consensus directs that approximately twice the lost volume should be replaced.

Other benefits are obvious after the specification and claims are read and fully understood.

The following examples are presented merely to teach specific working embodiments of the invention. Equivalents and uses, obvious to those skilled in the art, are intended to be incorporated within the invention as defined in the specification and appended claims.

EXAMPLE

Mongrel canines having a mean weight of 15 kgm were operated on under pentobarbital sodium anesthesia for bilateral placement of ligatures about the renal pelvi and/or for splenectomy. Seven days after operation, these animals were exposed to water loading. For water depletion testing, no renal ligatures were placed. The aortic blood pressure, the hermatocrit (HCT), blood water volume (BlW), and extracellular water volume (ECW) were determined before and after either loading or deprivation, and at indicated times. Where a control patent is used, neither loading nor deprivation was effected and a lapse of time equal to the same lapse for either loading or deprivation was allowed for the after determination. Where loading experiments were done, 30 minutes were allowed between the determinations. In depletion experiments determinations were made immediately after hemorrhage, at 2 hours post hemorrhage, and at 5 days post hemorrhage. The PV (or BlW) was measured with T-1824 dye, also defined as Evans blue dye; 30 minutes was allowed for equilibration of the dye. HCT was determined from multiple arterial and venous microhematocrit determinations (corrected for trapped plasma) and was related to the true or "total body" hematocrit by the ratio 0.85 – this ratio was empirically measured by comparing direct red cell volume and blood water measurements in 25 canines. Red cell mass (RBC) was calculated from the hematocrit and blood water volume. ECW was measured with radiobromium, Br-82, 2 hours was allowed for equilibration of the isotope. Interstitial water (ISW) was determined as the difference between ECW and TBV. Osmolality was determined by commercial osmometer. Specific gravities of all water solutions either added or removed were determined, thus specific correlations were established between the weight of either added or removed fluids. The partial pressure of water vapor in the ambient air was adjusted to the partial pressure of water vapor in the expired air of the animal under evaluation. During loading, the ligatures were tightened about the renal pelvi. Therefore, after the 30 minute interval for distribution of added water solutions, during the 2 hours allowed for equilibration of isotope and 30 minutes for equilibration of the dye, water losses from the animals were minimized.

All solutions were prepared on the day of use after careful weighing of dried reagents and addition of sterile water for injection, U.S.P., to 1,000 milliliters, Sterilization was accomplished by autoclave, after which a 5 milliliter aliquot of each was removed and analyzed for solute content, osmolality, pH and sterility. After evaluation, ligatures were removed, incisions closed, and animals returned to their cages.

Deprivation Tests

Fifteen canines to each of five series were observed during water deprivation of the ECW by hemorrhage at 47 percent of the TBV. In one series, no replacement water solution was administered, and, as reported in Table I, no animals survived 24 hours; these animals expiring secondary to cardiac and pulmonary arrest. In four additional series, applicant's solution (U.S.P. water containing 25 millimoles of $NaHCO_3$, 17 millimoles of KCL, 103 millimoles of NaCl and 5 millimoles of $MgSO_4$, osmolality = 300 pH − 7.6 = 7.8) and certain other water solutions were infused singly into the canines at the onset of ventricular fibrillation and cardiac arrest. The infused qualities were equal to the shed blood volume. Survival was 100 percent in animals receiving applicants' solution, with a mobilization

TABLE I

Comparison of applicant's solution with other water solutions (all values 1 hour after replacement of water solution equal to shed blood volume) of an additional 16 percent of RBC. Survival was reduced markedly in all animals receiving other water solutions. Regarding other water solutions, enhancement of TBV was best with sodium chloride, but pH and RBC decreases contributed to low survival. Similarly, pH and RBC alterations by other water solutions decreased survival. Furthermore, there is no statistical difference between animals receiving either no water replacement or either lactated Ringer's solution or Acetate Ringer's solution. These results are reported in Table I:

TABLE I

| CONDITION | TBV | HCT | RBC | BIW | ISW | ECW | Percent Mortality, 24 Hours |
|---|---|---|---|---|---|---|---|
| Steady State Before Deprivation | 1050 | 44 | 465 | 585 | 2670 | 3720 | |
| 47% Hemorrhage | 555 | 31 | 165 | 390 | 2590 | 3145 | 100, W/O Water replacement |
| | *53 | | 35 | 62 | 93 | 85 | |
| After Applicant's Solution pH 7.6 300 mO/L** 495 ml | 800 *76 | 31 | 235 51 | 565 97 | 2840 106 | 3640 98 | Zero (0%) |
| After Sodium Chloride pH 5.5 308 mO/L 495 ml | 820 *78 | 18 | 148 32 | 672 115 | 2912 109 | 3732 100 | 80 |
| After Lactated Ringer's and/or Normosol-R pH 6.5 260 mO/L 495 ml | 570 *54 | 23 | 150 32 | 420 72 | 3639 136 | 4209 113 | 90 |
| After Polysal and/or Plasma-Lite pH 6.7 280 mO/L 495 ml | 615 *58 | 26 | 160 34 | 455 78 | 3030 114 | 3645 98 | 75 |

*Percent of Steady State
**mO/l = millimoles/liter

EFFECT OF VARYING OSMOLALITIES OF APPLICANT'S SOLUTION DURING WATER DEPRIVATION

Table II indicates the effect of varying the osmolality of applicant's solutions (pH = 6.8 − 8.2) upon the mortality of canines after water deprivation through hemorrhage of 47 percent of steady state TBV. A 47 percent hemorrhage was sufficient to produce death in 100 percent of the canines in the absence of injection of parenteral fluids. The replacement of applicant's solution is equal to shed blood:

TABLE II

| Osmolality of Infused Solution (millimoles/liter) | Mortality percent | Δ RBC Mass After Infusion, Percent of TBV after 47% Hemorrhage |
|---|---|---|
| 460 | 15 | −10 |
| 340 | 15 | −10 |
| 310 | Zero | +4.0 |
| 300 | Zero | +15 |
| 290 | Zero | +2.5 |
| 260 | 25 | ±1.5 |
| 170 | 25 | −7 |

The above data clearly indicates basis for preferred osmolality ranges, especially the 290–310 range.

ESTABLISHMENT OF pH RANGE

Five canines to each of 10 series were observed during separate water deprivation tests of hemorrhage of 47 percent of TBV. The exact quantity of shed TBV was replaced at the onset of cardiac arrest with sodium chloride and sodium bircarbonate mixtures at pH in range of from 5.5 to 8.8. Although these solutions are not the same as applicant's solution, these data obtained are applicable with their invention. The preferred pH established with minimum mortality, i.e., no mortality, is from 6.8 to 8.2.

Additional pH range data was developed by water deprivation tests of hemorrhage of approximately 47 percent of TBV using multiple series of three and five canines. The same procedures as set forth above were followed; the exact quantity of shed TBV was replaced at the onset of cardiac arrest with solutions having pH's between 6.2 and 9.2. The solutions were made by altering the pH of a solution having the following makeup and having a pH initially adjusted to 7.5:

Each 100 ml. contains:
Sodium Chloride U.S.P. — 0.66 gm.
Sodium Bicarbonate U.S.P. — 0.15 gm.
Potassium Chloride U.S.P. — 0.10 gm.
Magnesium Sulfate Heptahydrate U.S.P. — 0.12 gm.

Water for Injection U.S.P. — Balance

The pH was adjusted by addition of either HCl or NaOH to the particular levels employed in the test series.

One hundred percent mortality was encountered when there was no replacement after hemorrhage of 47–50 percent TBV. The further results of this test are presented in the graph of FIG. 1. In FIG. 1, the vertical axis presents mortality percentages on a logarithmic scale. The horizontal axis in FIG. 1 is calibrated in terms of log pH.

The curve drawn on the graph of FIG. 1 includes a dashed portion at the low pH portion of the curve. The dashed portion represents a conservative extrapolation of the data observed a pH's 6.2, 6.5, and 6.8 in order to obtain pH valves at the 50 percent mortality rate ($LD_{50}$), and the 100 percent mortality rate.

From FIG. 1 it can be seen that the minimum mortality—in this test series, zero mortality—was observed with solutions having pH's between about 6.8 and about 8.2. FIG. 1 also shows that on the high pH side, 100 percent mortality was observed with solutions having pH's of about 8.8, while the extrapolated curve on the low pH side indicates that the 100 percent mortality level would be reached at a pH of approximately 5.3. The importance of pH, at least in situations involving severe trauma such as was present in the test series under discussion, both on the high side and on the low side, can be observed from FIG. 1 by noting the steep slope of the curve at each end of the pH range. The 50 percent mortality rate ($LD_{50}$) on the low pH side is crossed at about pH 5.95, and on the high pH side at a pH of about 8.4. While in most instances persons making use of the invention would far prefer to use solutions with pH's within the ranges which the foregoing tests show to produce zero mortality, the data on FIG. 1 shows that solutions somewhat more acid and somewhat more basic also have utility, and can be used to advantage, especially in situations involving less trauma than removal of 47–50 percent of TBV. For these reasons, the 50 percent mortality rate levels are regarded as defining the outer marks of the preferred pH range for solutions of the invention.

While the foregoing discussion has emphasized the importance of pH, and has presented data developed from severe trauma testing on canines to illustrate its importance, it should be understood that the criticality of pH as a parameter of the invention is not of the same order of importance as that of other parameters of the invention, such as osmolality. The reasons for the relatively lower importance of pH as a solution parameter lie in the fact that under most circumstances the quantity of solution administered to make up for lost liquid is small, and in the fact that the human blood stream, and the human water system taken as a whole, are inherently good self buffering systems. The first point can be appreciated by noting that in typical surgery, the total liquid loss runs in the neighborhood of 7–10 percent of TBV, which is far less than the approximately 47 percent blood loss involved in the canine test series just discussed. The second point can be appreciated if it is remembered that the human blood stream is rapidly self-buffering in the neighborhood of about 7.5. The practical significance of these facts for purposes of the present invention is that solutions meeting the other parameters of the invention can be employed, if desired, in small quantities at practically any pH, so long as the administered volume, taken in view of the pH, is not sufficient to overpower the self-buffering characteristics of the human blood stream and/or general water system, to thereby produce an undesirable acidic or alkaline condition.

WATER LOADING

Each of 15 canines in three different series were observed during water loading with (1) aqueous solutions of chloride, (2) aqueous solutions of sodium bicarbonate and (3) applicant's aqueous solution containing 25 millimoles of $NaHCO_3$, 17 millimoles of KCl, 103 millimoles of NaCl and 5 millimoles of $MgSO_4$. The mean ECW of the canine = 3,000 ml. Results of the tests are given in Table III:

TABLE III

| WATER SOLUTION ADMINISTERED | | | ECW AFTER INFUSION | | | ICW | RBC MASS |
|---|---|---|---|---|---|---|---|
| mO/L | Volume, ml | Total, ml | Percent Increase Water Volume | Percent Change Osmolality | mO/L | Percent Water Volume ECW | TBV percent Increase or Decrease |
| A. Aqueous Solution of Sodium Chloride | | | | | | | |
| 290 | 600 | 3610 | 20.3 | −0.66 | 298 | 0 | Decrease 5.2 |
| 300 | 600 | 3605 | 20 | −0.45 | 299 | 0 | Decrease ± 1.2 |
| 310 | 600 | 3798 | 26.6 | −1.66 | 295 | 6.6 | Decrease 6.4 |
| B. Aqueous Solution of Sodium Bicarbonate | | | | | | | |
| 290 | 600 | 3625 | 20.8 | −0.71 | 297 | 0 | Decrease 1.6 |
| 300 | 600 | 3656 | 21.5 | +0.15 | 302 | 0 | Increase ± 1.5 |
| 310 | 600 | 3710 | 23.4 | +0.15 | 301 | 3.6 | Decrease 3.3 |
| C. Applicant's Aqueous Solution | | | | | | | |
| 300 | 600 | 3600 | 20 | 0 | 300 | 0 | Increase 20 |

The above data indicate that with applicant's solution the ECW was expanded by the same increment as the load and there was neither an increase nor decrease in osmolality. Also, the RBC component of TBV was increased by same percentage as wal the ECW, hence BIW was expanded in identical manner, 20 percent, such that TBV was increased 20 percent.

COMPARISON WITH OTHER WATER SOLUTIONS DURING LOADING

Applicant's solution was compared with other water solutions at 30 minutes after canine water loading. The loading was equal to 100 percent of TBV. Data are presented in Table IV:

LOADING AT DIFFERENT OSMOLALITIES AND pH

Loading of ECW with applicant's solution at different osmolalities and pH was effected. The loading was equal to 100 percent of TBV. The infused solutions contain $Na^+$, $K^+$, $Cl^-$ and $HCO_3^-$ as the primary components and $Mg^{++}$, $HPO_4^=$ and $SO_4^=$ as minor components (3–10 millimoles) at the indicated osmolalities and pH. Results are indicated in Table VI:

TABLE IV

| CONDITION | TBV | HCT | RBC | BIW | ISW | ECW | Percent Mortality at 24 Hours |
|---|---|---|---|---|---|---|---|
| Steady State Before Loading | 1100 | 44 | 485 | 615 | 3900 | 5000 | |
| After Applicant's Solution pH 7.6 300 mO/L | 1320 +20 * | 44 — | 585 +20 | 735 +20 | 4800 +23 | 6120 +20 | Zero |
| After Sodium Chloride pH 5.5 308 mO/L (Normal saline) | 1160 +5 * | 37 −17 | 435 −17 | 725 +18 | 5300 +36 | 6460 +29 | 20 |
| After Lactated Ringer's and/or Normosol-R pH 6.5 260 mO/L | 1135 | 37 | 432 | 703 | 4915 | 6050 | Zero |
| After Polysal and/or Plasma-Lyte pH 6.7 280 mO/L | 1128 +3 * | 39 −11 | 440 −11 | 788 +28 | 4932 +27 | 6060 +22 | Zero |

\* % of Steady State

The above data indicate that with sodium chloride, the RBC was reduced 17 percent, and 20 percent of the canines expired. The other solutions produced no mortality, however, each produced dislocations of water and solutes and reduction in RBC as compared to applicant's solution (identified in "Water Loading" tests, osmolality = 300).

EFFECT ON BLOOD PRESSURE WITH APPLICANT'S SOLUTION

During water loading and water deprivation tests, the effect on the aortic and femoral blood pressures were observed. Results of these tests are indicated in Table V. Applicant's aqueous solution is identical to the one identified in "Water-Loading" tests.

TABLE V

| Condition | Blood Pressure Increase (%) | | Blood Pressure Decrease (%) | | BIW Increase (%) |
|---|---|---|---|---|---|
| | Aortic | Femoral | Aortic | Femoral | |
| Water Loading (% of TBV) | | | | | |
| 10 | 2.3 | 1 | | | 25 |
| 20 | 3 | 8 | | | 11 |
| 30 | 8 | 15 | | | 35 |
| Water deprivation (% of TBV through Hemorrhage) | | | | | |
| 10 | | | 2.0 | | 2 |
| 20 | | | 3 | 12.25 | 4 |
| 30 | | | 5.0 | 60 | 9.5 |
| 35 | | | 7.0 | 77 | 10 |
| 47 | | | 9.3 | 99 | 18 |

TABLE VI

| Osmolality (mO/L) | pH | ECW | % Change in RBC | Percent Mortality |
|---|---|---|---|---|
| 300 | 7.8 | +22.5 | +22 | Zero |
| | 6.8 | +21 | +12 | do. |
| 170 | 7.6 | +11 | 0 | do. |
| | 6.8 | +9 | − 3 | do. |
| 260 | 7.8 | +15 | + 5 | do. |
| | 6.8 | +13.5 | 0 | do. |
| 290 | 7.8 | +20 | +10 | do. |
| | 6.8 | +19 | + 3 | do. |
| 310 | 7.8 | +26 | + 8 | do. |
| | 6.8 | +28 | + 2 | do. |
| 340 | 7.8 | +34 | 0 | do. |
| | 6.8 | +40 | − 5 | do. |
| 460 | 7.8 | +40 | − 5 | do. |
| | 6.8 | +57 | −10 | do. |

What is claimed is:

1. An injectable acqueous solution comprising about 75 to about 150 millimoles of sodium cation, about 5 to about 50 millimoles of potassium cation, about 5 to about 50 millimoles of bicarbonate anion and about 75 to about 150 millimoles of chloride anion and having a pH of about 5.95 to about 8.4 and an osmolality of about 290 to about 310.

2. The composition of claim 1 wherein the osmolality is about 300.

3. The composition of claim 1 wherein about 1 to about 30 millimoles of magnesium cation and from about 1 to about 30 millimoles of phosphate and/or sulfate anion are incorporated into the composition.

4. The aqueous solution of claim 1 wherein there is incorporated about 1 to about 30 millimoles of magnesium cation.

5. The aqueous solution of claim 1 wherein there is incorporated about 1 to about 30 millimoles of phosphate anion or sulfate anion or a combination of phosphate and sulfate anions.

6. An injectable aqueous solution comprised of about 85 to about 140 millimoles of sodium cation, about 10 to about 40 millimoles of potassium cation, about 2 to about 20 millimoles of magnesium cation, about 85 to about 130 millimoles of chloride anion, about 10 to about 40 millimoles of bicarbonate anion and about 2 to about 20 millimoles of phosphate and/or sulfate anion(s) and the solution having a pH within the range of about 5.95 to about 8.4 and having an osmolality within the range of about 290 to about 310.

7. An acqueous solution for injection into a mammal comprising about 75 to about 150 millimoles of sodium cation, about 5 to about 50 millimoles of potassium cation, about 5 to about 50 millimoles of bicarbonate anion and about 75 to about 150 millimoles of chloride anion and having an osmolality of about 290 to about 310, and a pH insufficiently different from that of the system into which it is to be injected to materially alter the system pH.

* * * * *